US006873740B1

(12) United States Patent
Devillers et al.

(10) Patent No.: US 6,873,740 B1
(45) Date of Patent: Mar. 29, 2005

(54) METHOD FOR CODING AND DECODING MULTIMEDIA DATA

(75) Inventors: Sylvain Devillers, Paris (FR); Jean-Christophe Broudin, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 576 days.

(21) Appl. No.: 09/723,426

(22) Filed: Nov. 28, 2000

(30) Foreign Application Priority Data

Nov. 29, 1999 (EP) .............................. 99402972

(51) Int. Cl.⁷ ............................... G06K 9/36
(52) U.S. Cl. ................................... 382/243
(58) Field of Search ......................... 382/232–253, 382/190–228; 345/619–641

(56) References Cited

U.S. PATENT DOCUMENTS

| | | | | |
|---|---|---|---|---|
| 6,185,320 B1 | * | 2/2001 | Bick et al. | 382/132 |
| 6,490,370 B1 | * | 12/2002 | Krasinski et al. | 382/195 |
| 6,546,135 B1 | * | 4/2003 | Lin et al. | 382/190 |
| 6,564,263 B1 | * | 5/2003 | Bergman et al. | 707/104.1 |
| 6,593,936 B1 | * | 7/2003 | Huang et al. | 345/619 |
| 6,625,330 B1 | * | 9/2003 | Dubey et al. | 382/293 |

OTHER PUBLICATIONS

Report on Analysis of Video Segments in terms of Visual Information, Public Deliverable Esprit 28798 AVIR, Sep. 1999.*
"Everything Your Wanted to Know About MPEG–7: Part 2" by Nack et al, IEEE Multimedia, vol. 6, No. 4, Oct. 1999, pp. 64–73—XP00080605.
"Representation and the Dimensions of Shape Deformation", Proceedings of the International Conference on Computer Vision, Dec. 4–7, 1990, Conf. 3, XP010020131.

* cited by examiner

Primary Examiner—Jingge Wu

(57) ABSTRACT

The invention relates to a method of coding a plurality of multimedia data according to which original multimedia data are acquired and converted into one or several bitstreams in which the different levels of information are then captured by means of analysis and segmentation. A description step allows to generate from said obtained levels of information description data that are then coded. More precisely, this description step comprises a defining sub-step, provided for storing a set of descriptors related to said plurality of multimedia data, and a description sub-step, provided for selecting the description data to be coded in accordance with every level of information as obtained in the structuring step. The set of descriptors includes, according to the invention, at least a shape descriptor and a shape deformation descriptor.

7 Claims, 3 Drawing Sheets

METHOD FOR CODING AND DECODING MULTIMEDIA DATA

FIELD OF THE INVENTION

The invention relates to a method of coding a plurality of multimedia data comprising the following steps:
- an acquisition step, for converting said original multimedia data into one or several bitstreams;
- a structuring step, for capturing the different levels of information in said bitstream(s) by means of analysis and segmentation;
- a description step, for generating description data of the obtained levels of information;
- a coding step, allowing to encode the description data thus obtained.

The invention also relates to corresponding computer-executable process steps, and to a method for decoding data that have been coded by means of said coding method.

BACKGROUND OF THE INVENTION

More and more digital broadcast services are now available, and it therefore appears as useful to enable a good exploitation of multimedia information resources by users, that generally are not information technology experts. Said multimedia information generally consists of natural and synthetic audio, visual, and object data, intended to be manipulated in view of operations such as streaming, compression and user interactivity, and the MPEG-4 standard is one of the most agreed solutions to provide a lot of functionalities allowing to carry out said operations. The most important aspect of MPEG-4 is the support of interactivity by the concept of object, that designates any element of an audio-visual scene: the objects of said scene are encoded independently and stored or transmitted simultaneously in a compressed form as several bitstreams, the so-called elementary streams. The architecture of a typical MPEG-4 terminal, shown in FIG. 1, comprises the following elements (starting at the bottom of the figure, but the functionality "interactivity" means that said components may also be actuated in the reverse sense, from the terminal to the server or anyother type of transmitter):

(a) a delivery or transport layer 11 also called "TransMux layer" and which is media independent—MPEG-4 data can be transporter on transport layers such as RTP (Internet), MPEG-2 transport streams, H.323, or ATM, for instance—and receives multiplexed streams of compressed data from a transmission (or storage) medium;

(b) a synchronization or elementary stream layer 12, also called "FlexMux layer", which receives FlexMux streams from the layer 11 and which is in charge of the synchronization and buffering of the compressed data: this layer receives the packetized streams delivered by the transport layer 11 and outputs elementary streams respectively corresponding to different multimedia objects and composed of access units;

(c) a media layer (or compression layer) 13, receiving the elementary streams from the layer 12 and performing the decoding of the data that are extracted from said layer 12;

(d) a composition and rendering stage 14, intended to build the final scene arrangement, and a display 15 of the obtained audiovisual scene.

The specification of MPEG-4 include an object description framework intended to identify and describe the elementary streams (audio, video, etc . . . ) and to associate them in an appropriate manner in order to obtain the scene description and to construct and present to the end user a meaningful multimedia scene: MPEG-4 models multimedia data as a composition of objects. However the great success of this standard contributes to the fact that more and more information is now made available in digital form. Finding and selecting the right information becomes therefore harder, for human users as for automated systems operating on audio-visual data for any specific purpose, that both need information about the content of said information, for instance in order to take decisions in relation with said content.

The objective of the MPEG-7 standard, not yet frozen, will be to describe said content, i.e. to find a standardized way of describing multimedia material as different as speech, audio, video, still pictures, 3D models, or other ones, and also a way of describing how these elements are combined in a multimedia document. MPEG-7 is therefore intended to define a number of normative elements called descriptors D (each descriptor is able to characterize a specific feature of the content, e.g. the color of an image, the motion of an object, the title of a movie, . . . ), description schemes DS (the Description Schemes define the structure and the relationships of the descriptors), description definition language DDL (intended to specify the descriptors and description schemes), and coding schemes for these descriptions (FIG. 2 gives a graphical overview of these MPEG-7 normative elements and their relation). Whether it is necessary to standardize descriptors and description schemes is still in discussion in MPEG. It seems however likely that at least a set of the most widely used will be standardized.

SUMMARY OF THE INVENTION

It is therefore an object of the invention to propose a new descriptor (and a new, corresponding description scheme) intended to be very useful in relation with the MPEG-7 standard.

To this end, the invention relates to a coding method as described in the introductory part of the description and in which said description step comprises:
- a defining sub-step provided for storing a set of descriptors related to said plurality of multimedia data; and
- a description sub-step, provided for selecting the description data to be coded in accordance with every level of information as obtained in the structuring step; and said set of descriptors includes at least a shape descriptor and a shape deformation descriptor.

The invention also relates, for their use in a coding device provided for encoding a plurality of multimedia data, to computer-executable process steps provided to be stored on a computer-readable storage medium and comprising the following steps:
- an acquisition step, for converting said original multimedia data into one or several bitstreams
- a structuring step, for capturing the different levels of information in said bitstream(s) by means of analysis and segmentation;
- a description step, for generating description data of the obtained levels of information;
- a coding step, allowing to encode the description data thus obtained; wherein said description step comprises:
- a defining sub-step provided for storing a set of descriptors related to said plurality of multimedia data; and
- a description sub-step, provided for selecting the description data to be coded in accordance with every level of information as obtained in the structuring step; and said
} set of descriptors includes at least a shape descriptor and a shape deformation descriptor.

BRIEF DESCRIPTION OF THE DRAWINGS

The present invention will now be described, by way of example, with reference to the accompanying drawings in which.

DETAILED DESCRIPTION OF THE INVENTION

Figure 1:
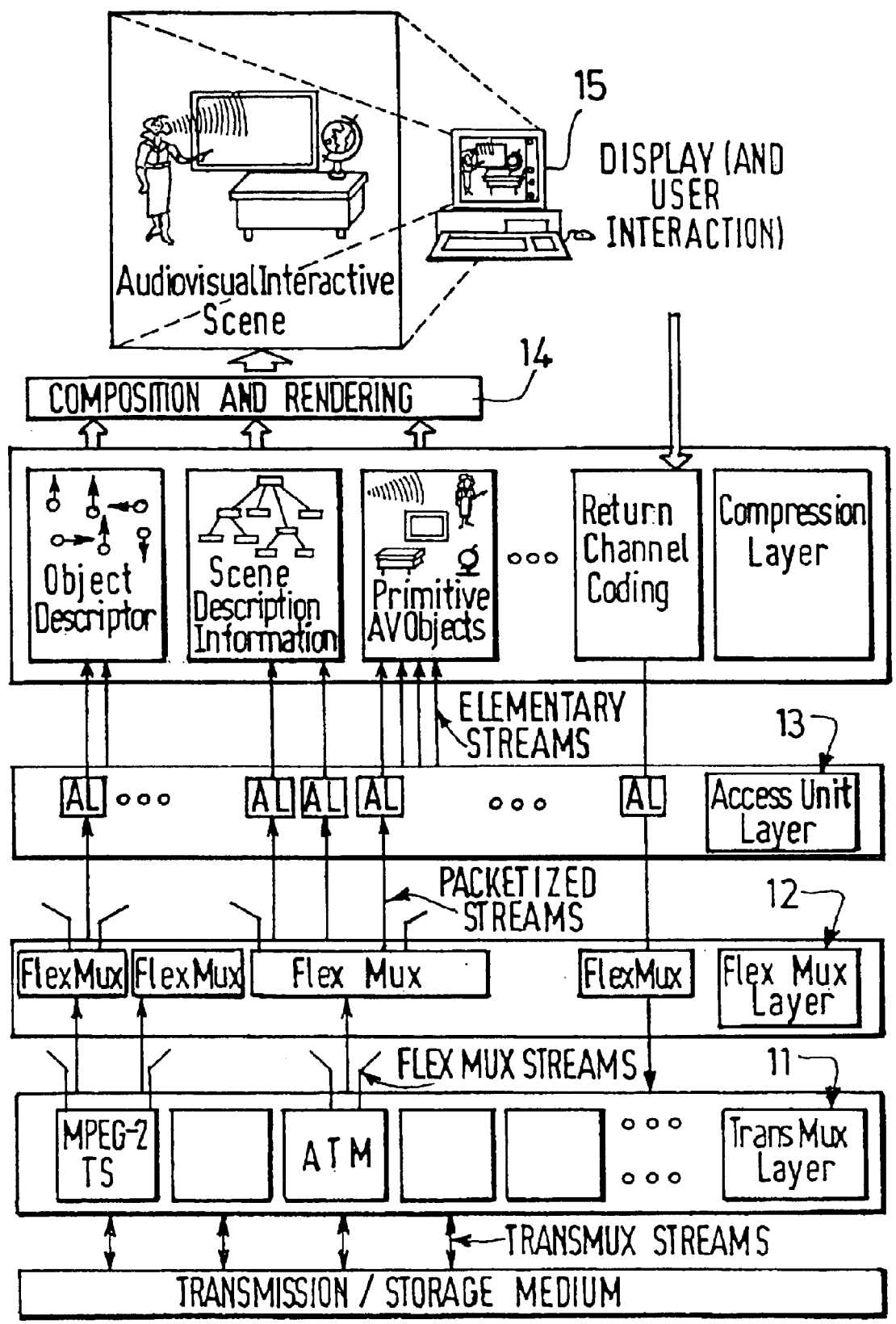
FIG. 1 illustrates the architecture of an MPEG-4 terminal allowing to process and reconstruct an audiovisual interactive scene.
Figure 2:
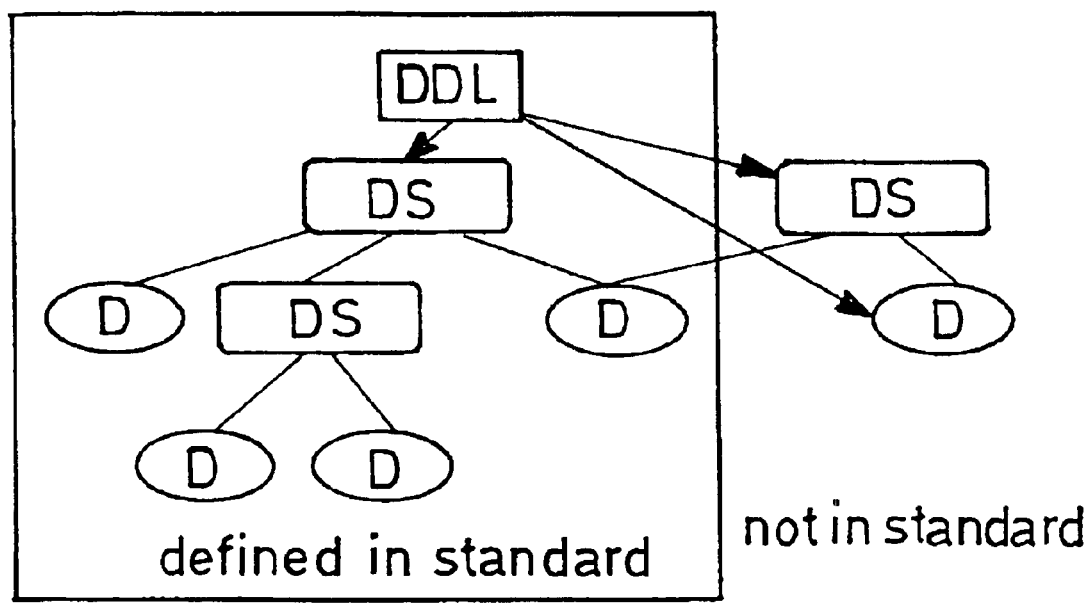
FIG. 2 gives a graphical overview of MPEG-7 normative elements and their relation, and therefore defines the MPEG-7 environment in which users may then deploy other descriptors (either in the standard or, possibly, not in it)
Figure 3:
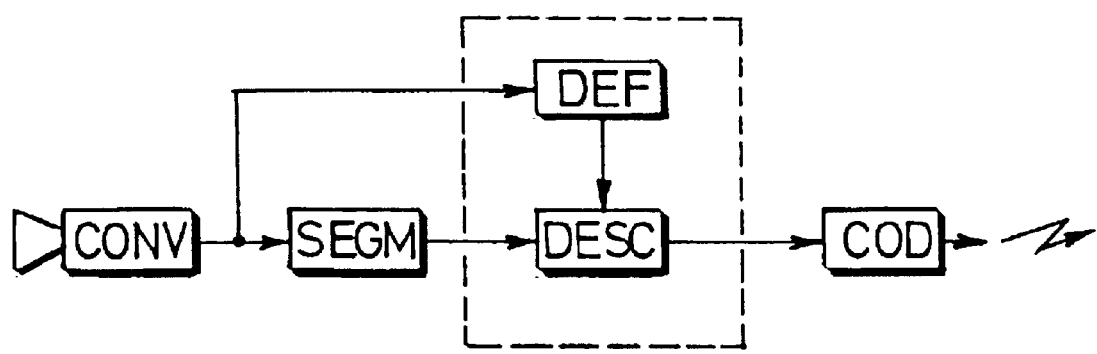
FIGS. 3 and 4 illustrate the coding and decoding methods according to the invention.
Figure 4:
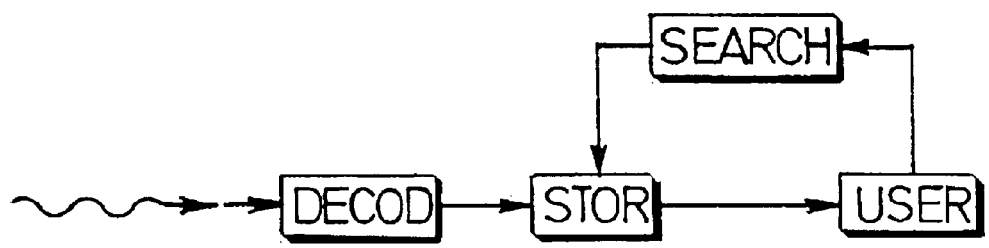

The method of coding a plurality of multimedia data according to the invention, illustrated in FIG. 3, comprises the following steps: an acquisition step (CONV), for converting the available multimedia data into one or several bitstreams, a structuring step (SEGM), for capturing the different levels of information in said bitstream(s) by means of analysis and segmentation, a description step, for generating description data of the obtained levels of information, and a coding step (COD), allowing to encode the description data thus obtained. More precisely, the description step comprises a defining sub-step (DEF), provided for storing a set of descriptors related to said plurality of multimedia data, and a description sub-step (DESC), for selecting the description data to be coded, in accordance with every level of information as obtained in the structuring step on the basis of the original multimedia data. The coded data are then transmitted and/or stored. The corresponding decoding method, illustrated in FIG. 4, comprises the steps of decoding (DECOD) the signal coded by means of the coding method hereinabove described, storing (STOR) the decoded signal thus obtained, searching (SEARCH) among the data constituted by said decoded signal, on the basis of a search command sent by an user (USER), and sending back to said user the retrieval result of said search in the stored data.

Among the descriptors stored in relation with all the possible multimedia content, the two ones proposed according to the invention are based on complex Fourier descriptors, in order to characterize a shape and its deformation in time, i.e to characterize a segmented moving object as more or less rigid. Indeed, much semantic information may be extracted from the shape of an object and its deformation in time. For example, in a video-surveillance application, the rigidity of a moving region allows to differentiate pedestrians from vehicles. However, when vehicles are driving away from the camera, the 2D shape changes due to the perspective effect.

In order to cope with this possible variation of scale or translation, the proposed descriptor, that has therefore to be invariant to basic geometrical transformations and to be scalable in order to be able to describe the shape and its deformation with more or less precision, is based on complex Fourier descriptors, which are invariant by translation, rotation and scaling. Moreover, a compact shape deformation descriptor is then extracted by measuring the variability of the different frequencies in time.

The definition of complex Fourier descriptors is the following. These descriptors consist in a lossless representation of a shape contour G. A contour is defined as a set of points surrounding a surface. Depending on the sampling, points are not necessarily connex. The length of the contour is the number of points used to describe it and therefore also depends on the sampling. Complex Fourier descriptors, that are an equivalent frequencial description and not a parametric representation, are defined by:

$$Z_K = \sum_{N=1}^{L} z_n \exp\left(\frac{2*i*\pi*n*k}{N}\right), \quad 0 \leq k < N \quad (1)$$

where $Z_n = x_n + iy$ stands for the coordinates of the $n^{th}$ point of G, written as a complex number (real part is absciss, imaginary part is ordinate), L stands for the length of G and N is the number of frequency bins.

These descriptors have the same meaning as in signal processing: low frequencies, for k around 0 and n−1, give a coarse idea of the shape, while high frequencies, for k around $$\frac{N}{2},$$

represent fine details. This means that if two contours are very similar but for small details or for a small local part, the first coefficients will be very close, whereas the last ones will be completely different. Besides, if the shape is not rigid, the shape contour will change and so do the first coefficients. Of course the last ones will change as well, but will not be significant. Hence, first coefficients aim at clustering shape contours. Intrinsically, complex Fourier descriptors are a scalable representation of the contour:

$Z_0$ stands for the continuous component (DC or Direct Current) and represents the non-normalized centroid of the contour;

$Z_1$ is the radius of the circle whose surface is equivalent to that of the shape, which can be interpreted as a scale parameter;

$Z_k$ and $Z_{N-k}$, with 1<k<N, have similar but opposite properties: k being the number of actions regularly spaced on the unity circle, k, $$1 < K \leq \frac{N}{2}$$

represents the number of tension actions on the unity circuit towards the outside, whereas k, $$\frac{N}{2} + 1 < k < N$$

represents the number of pressure actions towards the inside;

The phase $\phi_k$ of $Z_k$ locates the action on the circle.

The properties of complex Fourier descriptors will be now recalled. Assume that a contour $\Gamma_1$ is translated by $\overline{T}$, rotated by $\phi$ and scaled by a factor $\lambda$ to obtain $\Gamma_2$, $\Gamma_1$ and $\Gamma_2$ having the same number of points. Then, there exists a simple relation between the complex Fourier descriptors $Z_k^1$, $0 \leq k < N$ of $\Gamma_1$ and $Z_k^2 0 \leq k < N$ of $\Gamma_2$:

$$Z_k^2 = \overline{T} + \lambda \exp(i\phi) Z_K^1, \quad 0 \leq k < N \quad (2)$$

Making $Z_k$ invariant by translation, rotation and scaling is equivalent to cancelling the effects of $\overline{T}$, $\phi$ and $\lambda$. Said properties are:

(a) translation invariance: $\overline{T}$ being a continuous component and being therefore contained in $Z_0$, by not considering $Z_0$, the set of coefficients $\{Z_k, 1\leq k<N\}$ is translation invariant.
(b) rotation and starting point invariance:
By considering the set of coefficients $\{abs(Z_k), 1\leq k<N\}$ where abs( ) is the modulus of $Z_k$ $\{abs(Z_k), 1\leq k<N\}$ is phase invariant. As both the starting point and a rotation induce a move of the phase (in fact, a multiplication by $\exp(i\phi)$), the descriptor is rotation and starting point invariant.
(c) 'scale factor invariance:
when focusing on:

$$abs(Z_K^2)=\lambda abs(Z_K^1), 1\leq k<N$$

$$\left\{abs\left(\frac{Z_k}{Z_1}\right), 1\leq k<N\right\}$$

and finally considering the set of coefficients, the resulting descriptor is also scale invariant. Unfortunately, $\lambda$ is not known, but present in each $Z_t$. It is chosen to normalize by one of the descriptors. Since $Z_1$ is known to be a scale factor, each $abs(Z_k)$, $1<k<N$, will be divided by $abs(Z_1)$.
Hence, $$\left\{abs\left(\frac{Z_k}{Z_1}\right), 1\leq k<N\right\}$$

is translation, rotation and scale invariant.
(d) contour length invariance: the equation (1) being established for two contours of same number of points, if their number of points differ, then their frequencial description will also differ. Their difference of length can be interpreted as a difference of sampling. To cancel the influence of length, one contour must be resampled to the length of the other. By choosing for L a power of two, one can take N=L, which makes the description also sampling invariant. As a matter of fact, if the contour $\Gamma$ is downsampled from $L_1=2^{m_1}$ points to $L_2=2^{m_2}$, with $m_2<m_1$, then the first and last frequency bins of each descriptor will correspond exactly to the same frequency, because the frequency lap $$\frac{N}{L}$$

remains the same (and conversely for upsampling from $L_1=2^{m_1}$ point to $L_2=2^{m_2}$, $m_2<m_1$).
(e) compaction property:
$\{Z_k, 0\leq k\leq N_0 \cup N-N_0 \leq k<N\}$ will be a truncated list of the complete list of the N complex Fourier descriptors necessary to describe the shape losslessly, and the resulting reconstructed shape will be a filtered version of the initial shape (the number $N_0$, with $1\leq N_0<N$, of descriptors to retain depends on the complexity of the contour; however, 50% of all coefficients are necessary to obtain a well-reconstructed contour with very few artifacts).
(f) robustness to incomplete view: as experiments have shown that the Fourier descriptors are sometimes very similar, sometimes completely different (depending on the contour and the percentage of occlusion), it must be recognized that they are not robust to incomplete view.
(g) scalability: complex Fourier descriptors are intrinsically scalable: the higher the frequency, the finest the description.
These definition and properties being recalled, the shape descriptor according to the invention is now presented:

(a) descriptor definition
The input data are a binary mask of an object sampled on a regular grid. The object has no holes, and is not a fractal object. Beforehand, the contour of the object must be extracted, then resampled for its number of points to be a power of two $L_2=2^m$.
(b) specifications of the proposed shape descriptor:
The descriptor should not only contain the necessary information on the shape but also be a summary of the full information available at start. The following descriptor, especially usable in the MPEG-7 standard, is therefore proposed:
Centroid ($C_x$, $C_y$): coordinates of the centroid of the contour.
Angle $\theta$: angle between horizontal and main axis of the contour.
Size of the original contour N: size of the contour after resampling.
Set of ordered Fourier coefficients $Z_k$: set of invariant Fourier coefficients.
Size of the Fourier coefficients set P: size of the preceding set, with $1<P\leq N$, P being necessarily odd.
Scale: scale parameter.
The corresponding C structure may be the following one:

```
typedef struct Shape Descriptor {
    /* Centroid */
    long center x;
    long center y;
    /* Angle */
    float theta;
    /* Size of the original contour, after resampling (N) */
    long size of contour;
    /* Set of Fourier coefficients */
    float *Fourier Coefficients;
    /* Size of the set of Fourier coefficients (P) */
    long size Fourier Descriptors Set;
};
```

(c) extraction of this shape descriptor:
These are the steps which lead to a set of invariant Fourier coefficients:
Compute the two eigenvectors and the two eigenvalues from the contour and store angle as the angle $\theta$ between the eigenvector associated with the biggest eigenvalue and the horizontal ($\theta$ is known modulo $\pi$).
Compute the FFT on the resampled contour of size N, in order to obtain $\{Z_k, 0\leq k<N\}$, and store centroid as:

$$C_x = \frac{Re(Z_0)}{N}$$

$$C_y = \frac{Im(Z_0)}{N}$$

Take modulus of each $\{Z_k, 1\leq k<N\}$
Store scale as:

$$scale = \frac{abs(Z_i)}{N}$$

Divide each $\{Z_k, 2\leq k<N\}$ by $abs(Z_1)$ and store as Fourier coefficients $Z_j'$, with $1\leq j\leq N$
Depending on the application, choose the final number P out of N Fourier coefficients to keep.

Store Fourier coefficients $$\text{abs}\left(\frac{Z_k}{Z_1}\right)$$

in the following order:

$$Z'_1 \ldots Z'_p = \text{abs}\left(\frac{Z_2}{Z_1}\right)\text{abs}\left(\frac{Z_{N-1}}{Z_1}\right) \ldots \text{abs}\left(\frac{Z_{\frac{P}{2}}}{Z_1}\right)\text{abs}\left(\frac{Z_{N-\frac{P}{2}+1}}{Z_1}\right)$$

(d) matching:

Given two sets of Fourier descriptors $\Theta_1$ and $\Theta_2$, in order to compare their similarity neither the position nor the angle, which do not characterize the shape itself and can be treated separately, will be taken into account. If the two sets are of different sizes, $P_1$ and $P_2$ respectively, with for instance $P_1 < P_2$, then the first $P_1$ Fourier coefficients of the two sets must be compared. Considering that for one set, values $f_{\Theta_i}(k)$ at each frequency bin of order k are of different order of magnitude, it is relevant, for each frequency bin, to normalize the difference of values between the two sets by the magnitude at the current frequency bin. To harmonize the difference of magnitude between frequencies, it has been chosen to sum relative errors between corresponding frequency bin values $f_{\Theta_i}(k)$ of the two descriptors. Finally, it should be considered that the coarse structure (low frequencies) prevails over fine details (high frequencies), and a weighting function $\omega(k)$, which privileges low frequency range at the expense of high frequency range, is therefore introduced and sets the influence of details in the final result. $\Delta$ will denote the dissimilarity function and $\Lambda$ the corresponding similarity function. Return values are between 0 and 1.

$$\Delta(\Theta_1, \Theta_2) = \frac{\sum_{k=1}^{P} 2\omega(k)E(Z'_{\Theta_1}(k), Z'_{\Theta_2}(k))}{\Omega}$$

$P = \min(P_1, P_2)$ $$\omega(k) = \frac{1}{1+k^2}$$

$$E(x, y) = \frac{x-y}{x} \quad \text{si } x > y$$

$$= \frac{y-x}{y} \quad \text{si } y > x$$

$$\Omega = \sum_{k=1}^{P} 2\omega(k)$$

$\text{Sim} = 1 - \Delta(\Theta_1, \Theta_2)$

Similarly, the shape deformation descriptor according to the invention is now presented:

(a) descriptor definition:

The input data is a segmented video sequence of an unique object, i.e. a sequence of binary masks. The shape descriptor of the contour at each frame will be computed and stored for processing, as described above in "(c) extraction of the shape descriptor". This descriptor is based upon the shape descriptor exposed above, with:

Normalized deviation of the scale: normalized deviation of the scale parameter over the video sequence.

Maximal size of the original contours $N_{max}$ the maximal size of the original contour sizes N over the video sequence. N is an item of the shape descriptor.

Normalized deviations of each Fourier coefficient $\sigma_{Z'_k}$: normalized deviations of each Fourier coefficient over the video sequence.

Size of the set of normalized deviations of each Fourier coefficient M: size of the preceding set.

The corresponding C structure may be the following one:

```
typedef struct ShapeDeformationDescriptor {
    /* Normalized deviation of scale */
    float Deviation of Scale;
    /* Maximal size of the original contours in the video sequence
    (N max)
    */long Maximal Size of Original contours;
    /* Normalized deviation on Fourier coefficients */
    float *Deviation of Fourier coefficients;
    /* Size of the set of normalized deviations of Fourier
    coefficients */
    lng Size of Fourier Coefficients Set;
};
```

(b) extraction of this shape deformation descriptor:

The deviation of the scale factor and of each Fourier coefficient over the video sequence is calculated by using the standard deviation. Dividing by the mean provides a normalization of the deviation. The size of the set of Fourier coefficients may vary along the video sequence, but as the frequency lap remains the same, the $k^{th}$ Fourier coefficient $Z_k'^i$ of $i^{th}$ frame will be averaged with the $k^{th}$ Fourier coefficient $Z_k'^j$ of $j^{th}$ frame. The steps are the following:

Calculate the mean of scale over the video sequence,

Calculate the mean of each Fourier coefficient $Z_k'$ over the video sequence,

Calculate the standard deviation of scale over the video sequence,

Calculate the standard deviation of each Fourier coefficient $Z_k'$ over the video sequence, Divide the standard deviation of scale by its mean, and store as $\sigma_{scale}$, Divide each $Z_k'$ by its mean, and store as $\sigma_{Z'_k}$.

(c) matching:

Although a matching function is not relevant for this shape deformation descriptor, because shape deformation descriptors are not intended to be compared, such a function may however be provided. The following function quantifies the similarity between two shape deformation descriptors $\Theta_1$, and $\Theta_2$. The number of normalized deviations of Fourier coefficients involved in the calculation depends on the sizes $M_1$ and $M_2$ of the two sets of normalized deviations that have be to compared. A weighting function $\omega(k)$ privileges low frequency range at the expense of high frequency range, in order to set the influence of details in the final result. $\Delta$ will denote the dissimilarity function and $\Lambda$ the corresponding similarity function.

$$\Delta(\Theta_1, \Theta_2) = \frac{\sum_{k=1}^{M} 2\omega(k)E(\sigma_{Z_{1,k}}, \sigma_{Z_{1,k}})}{\Omega}$$

$M = \min(M_1, M_2)$ $$\omega(k) = \frac{1}{1+k^2}$$

-continued $$E(x, y) = \frac{x-y}{x} \quad si \quad x > y$$
$$= \frac{y-x}{y} \quad si \quad y > x$$

$$\Omega = \sum_{k=1}^{M} 2\omega(k)$$

Sim=$1-\Delta(\Theta_1, \Theta_2)=\Lambda$

The shape descriptor that has been proposed is appropriate for still images and the shape deformation descriptor for objects in video sequences. The shape descriptor is based on complex Fourier descriptors whose theory has been explained. It gives a frequencial description of the contour of the objects. First results show that the shape descriptor is both robust and discriminating. It is invariant by translation, rotation and scaling and also scalable. It handles resampling. Tests have even proved that downsampling increase matching scores. The dedicated matching function allows to set the degree of similarity between two objects, as explained in the paragraph "(d) matching".

This shape descriptor is used as a basis to characterize shape deformation in a video sequence and thus to define a percentage of variation of each Fourier coefficient. That is possible because of the meaningful interpretation of its frequencial description. First results presented indicate that it is possible to evaluate how much a shape can be deformed, by looking at. Its normalized deviation appears to quantify the degree of deformation. Its value is the deformation rate. Even if it is not designed for, this descriptor can be considered as a signature of the shape deformation and may be used in a query search in order to match objects that get out of shape in the same way.

What is claimed is:

1. A method of coding a plurality of multimedia data comprising the following steps:

an acquisition step, for converting said original multimedia data into one or several bitstreams;

a structuring step, for capturing the different levels of information in said bitstream(s) by means of analysis and segmentation;

a description step, for generating description data of the obtained levels of information;

a coding step, allowing to encode the description data thus obtained;

wherein said description step comprises:

a defining sub-step provided for storing a set of descriptors related to said plurality of multimedia data; and a description sub-step, provided for selecting the description data to be coded in accordance with every level of information as obtained in the structuring step;

and said set of descriptors includes at least a shape descriptor and a shape deformation descriptor;

wherein the shape descriptor is defined by means of the following characteristics:

Centroid ($C_x$, $C_y$): coordinates of the centroid of the contour;

Angle $\theta$: angle between horizontal and main axis of the contour;

Size of the original contour N: size of the contour after resampling;

Set of ordered Fourier coefficients $Z_k'$: set of invariant Fourier coefficients;

Size of the Fourier coefficients set P: size of the preceding set, with $1<P\leq N$, P being necessarily odd;

Scale: scale parameter;

the shape deformation descriptor is defined by means or the following characteristics:

Normalized deviation of the scale: normalized deviation of the scale parameter over the video sequence;

Maximal size of the original contours N: the maximal size of the original contour sizes N over the video sequence;

N is an item of the shape descriptor;

Normalized deviations of each Fourier coefficient $\sigma_{z'k}$: normalized deviations of each Fourier coefficient over the video sequence;

Size of the set of normalized deviations of each Fourier coefficient M: size of the preceding set.

2. A method as claimed in claim 1, wherein the following C structure is associated to said shape descriptor:

```
typedef struct Shape Descriptor {
    /* Centroid */
    long center x;
    long center y;
    /* Angle */
    float theta;
    /* Size of the original contour, after resampling (N) */
    long size of contour;
    /* Set of Fourier coefficients */
    float *Fourier Coefficients;
    /* Size of the set of Fourier coefficients (P) */
    long size Fourier Descriptors Set;
};
``` and the following C structure is associated to said shape deformation descriptor :

```
    /* Normalized deviation of scale */
    float Deviation of Scale;
    /* Maximal size of the original contours in the video
sequence (N max)
*/long Maximal Size of Original contours;
/* Normalized deviation on Fourier coefficients */
float *Deviation of Fourier coefficients;
/* Size of the set of normalized deviations of Fourier
coefficients */
        lng Size of Fourier Coefficients Set;
}.
```

3. For use in a coding device provided for encoding a plurality of multimedia data, computer-executable process steps provided to be stored on a computer-readable storage medium and comprising the following steps:

an acquisition step, for converting said original multimedia data into one or several bitstreams;

a structuring step, for capturing the different levels of information in said bitstream(s) by means of analysis and segmentation;

a description step, for generating description data of the obtained levels of information;

a coding step, allowing to encode the description data thus obtained;

wherein said description step comprises:

a defining sub-step provided for storing a set of descriptors related to said plurality of multimedia data; and a description sub-step, provided for selecting the description data to be coded in accordance with every level of information as obtained in the structuring step;

and said set of descriptors includes at least a shape descriptor and a shape deformation descriptor, wherein the shape descriptor is defined by means of the following characteristics:

Centroid ($C_x$, $C_y$): coordinates of the centroid of the contour;

Angle θ: angle between horizontal and main axis of the contour;

Size of the original contour N: size of the contour after resampling;

Set of ordered Fourier coefficients $Z_k'$: set of invariant Fourier coefficients;

Size of the Fourier coefficients set P: size of the preceding set, with 1<P≦N, P being necessarily odd;

Scale: scale parameter;

the shape deformation descriptor is defined by means of the following characteristics:

Normalized deviation of the scale: normalized deviation of the scale parameter over the video sequence;

Maximal size of the original contours $N_{max}$: the maximal size of the original contour sizes N over the video sequence;

N is an item of the shape descriptor;

Normalized deviations of each Fourier coefficient $\sigma_{z'k}$: normalized deviations of each Fourier coefficient over the video sequence;

Size of the set of normalized deviations of each Fourier coefficient M: size of the preceding set.

4. A computer program product for a multimedia data coding device, comprising a set of instructions which when loaded into said coding device lead it to carry out the process steps as claimed in claim 3.

5. A transmittable coded signal produced by encoding multimedia data according to a coding method as claimed in claim 1.

6. A method of decoding and processing a signal as claimed in claim 5, wherein said method comprises the following steps:

a decoding step;

a storing step, for storing the decoded signals;

a search step, actuated by an user;

a retrieval step, on the basis of the actuated search and the stored, decoded signals.

7. The compute-executable process of claim 3, wherein the following C structure is associated to said shape descriptor:

```
typedef struct Shape Descriptor {
    /* Centroid */
    long center x;
    long center y;
    /* Angle */
    float theta;
    /* Size of the original contour, after resampling (N) */
    long size of contour;
    /* Set of Fourier coefficients */
    float *Fourier Coefficients;
    /* Size of the set of Fourier coefficients (P) */
    long size Fourier Descriptors Set ;
};
``` and the following C structure is associated to said shape deformation descriptor:

```
/* Normalized deviation of scale */
float Deviation of Scale;
/* Maximal size of the original contours in the video sequence (N max)
*/long Maximal Size of Original contours;
/* Normalized deviation on Fourier coefficients */
float *Deviation of Fourier coefficients;
/* Size of the set of normalized deviations of Fourier coefficients */
        lng Size of Fourier Coefficients Set;
}.
```

* * * * *